(12) United States Patent
Wang et al.

(10) Patent No.: US 11,358,288 B2
(45) Date of Patent: Jun. 14, 2022

(54) SOFT ROBOTIC GRIPPER WITH HYBRID STRUCTURE AND GRASPING RELIABILITY

(71) Applicant: THE UNIVERSITY OF HONG KONG, Hong Kong (CN)

(72) Inventors: Zheng Wang, Hong Kong (CN); Jianshu Zhou, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 0 days.

(21) Appl. No.: 16/769,376

(22) PCT Filed: Dec. 12, 2018

(86) PCT No.: PCT/CN2018/120518
§ 371 (c)(1),
(2) Date: Jun. 3, 2020

(87) PCT Pub. No.: WO2019/114738
PCT Pub. Date: Jun. 20, 2019

(65) Prior Publication Data
US 2020/0298420 A1  Sep. 24, 2020

Related U.S. Application Data

(60) Provisional application No. 62/598,090, filed on Dec. 13, 2017.

(51) Int. Cl.
*B25J 15/00* (2006.01)
*B25J 9/14* (2006.01)
*B25J 15/10* (2006.01)

(52) U.S. Cl.
CPC ........... *B25J 15/0023* (2013.01); *B25J 9/142* (2013.01); *B25J 15/0028* (2013.01); *B25J 15/10* (2013.01)

(58) Field of Classification Search
CPC .... B25J 15/0023; B25J 15/0028; B25J 15/10; B25J 15/08; B25J 9/142
See application file for complete search history.

(56) References Cited

U.S. PATENT DOCUMENTS

2013/0152724 A1* 6/2013 Mozeika ............... B25J 9/0015
74/490.05
2016/0136820 A1* 5/2016 Lessing ................... B25J 15/12
294/208

FOREIGN PATENT DOCUMENTS

CN  105437253 A  3/2016
CN  105583838 A  5/2016
(Continued)

OTHER PUBLICATIONS

International Search Report and Written Opinion dated Feb. 27, 2019 in International Application No. PCT/CN2018/120518.
(Continued)

*Primary Examiner* — Stephen A Vu
(74) *Attorney, Agent, or Firm* — Saliwanchik, Lloyd & Eisenschenk

(57) ABSTRACT

A robotic end effector and method for use thereof are provided. The robotic end effector can include a rigid base structure (230), a plurality of rigid proximal phalanges (210) connected to the rigid base structure (230), a plurality of rigid distal phalanges (200) connected to the proximal phalanges (210) respectively, and a plurality of bellows (250), wherein one end of a proximal phalange (210) is connected to one end of the base structure (230) by a bellows (250), wherein one end of a distal phalange (200) is connected to a proximal phalange (210) by a bellows (250), and wherein a portion of the base structure (230), each proximal phalange (210), and each distal phalange (200) are covered
(Continued)

in silicone rubber. It can achieve a high output force to input pressure ratio, and cost efficiently.

11 Claims, 17 Drawing Sheets

(56) References Cited

FOREIGN PATENT DOCUMENTS

| CN | 105583846 A | | 5/2016 | |
|---|---|---|---|---|
| CN | 106003131 A | * | 10/2016 | ............... B25J 15/12 |
| JP | 08-300284 A | | 11/1996 | |
| JP | 08-323675 A | | 12/1996 | |
| WO | WO-2005065264 A2 | * | 7/2005 | .......... B25J 15/0009 |
| WO | WO-2014177272 A2 | * | 11/2014 | ............... A61F 2/586 |
| WO | WO-2016172670 A1 | * | 10/2016 | ............... B25J 9/142 |

OTHER PUBLICATIONS

International Preliminary Report on Patentability dated Mar. 22, 2020 in International Application No. PCT/CN2018/120518.
Shen, H., "Meet the soft, cuddly robots of the future", Nature, Feb. 3, 2016, pp. 1-9.
Rus, D. et al., "Design, fabrication and control of soft robots", Nature, May 28, 2015, 521:467-475, Macmillan Publishers Limited.
Wang, Z. et al., "A Prestressed Soft Gripper: Design, Modeling, Fabrication, and Tests for Food Handling", IEEE Robotics and Automation Letters, Oct. 2017, 2(4):1909-1916.
Zhou, J. et al., "A Soft-Robotic Gripper With Enhanced Object Adaptation and Grasping Reliability", IEEE Robotics and Automation Letters, Oct. 2017, 2(4):2287-2293.
Softroboticsinc. 2017. Softrobotics soft gripper. [Online] Available at: https://www.softroboticsinc.com/. [Accessed Nov. 15, 2017], 9 pages.
Galloway, K.C. et al., "Soft Robotic Grippers for Biological Sampling on Deep Reefs", Soft Robotics, Nov. 1, 2016, vol. 3, 21 pages, Mary Ann Liebert, Inc.
Ilievski, F. et al., "Soft Robotics for Chemists", Angew. Chem. Int. Ed., 2011, 50:1890-1895, Wiley-VCH Verlag GmbH & Co. KGaA, Weinheim.
Deimel, R. et al., "A Compliant Hand Based on a Novel Pneumatic Actuator", 2013 IEEE International Conference on Robotics and Automation (ICRA), Karlsruhe, Germany, May 6-10, 2013, pp. 2047-2053.
Deimel, R. et al., "A novel type of compliant and underactuated robotic hand for dexterous grasping", The International Journal of Robotics Research, 2016, 35(1-3):161-185.
Marchese, A.D. et al., "A Recipe for Soft Fluidic Elastomer Robots", Soft Robotics, Nov. 1, 2015, 2(1):7-25, Mary Ann Liebert, Inc.
Schulz, G.S. et al., "A New Anthropomorphic Robotic Hand", 2008 $8^{th}$ IEEE-RAS International Conference on Humanoid Robots, Dec. 1-3, 2008, Daejeon, Korea, pp. 418-422.
Borenstein, J. et al., "The OmniTread OT-4 Serpentine Robot", 2008 IEEE International Conference on Robotics and Automation, Pasadena, CA, USA, May 19-23, 2008, pp. 1766-1767.
Schulz, S. et al., "A New Ultralight Anthropomorphic Hand", Proceedings of the 2001 IEEE International Conference on Robotics & Automation, Seoul, Korea, May 21-26, 2001, pp. 2347-2441.
Paez, L. et al., "Design and Analysis of a Soft Pneumatic Actuator with Origami Shell Reinforcement", Soft Robotics, Nov. 3, 2016, vol. 3, pp. 1-11, Mary Ann Liebert, Inc.
Chen, Y. et al., "A Reconfigurable Hybrid Actuator with Rigid and Soft Components", 2017 IEEE International Conference on Robotics and Automation (ICRA), Singapore, May 29-Jun. 3, 2017, pp. 58-63.
Bicchi, A. et al., "Robotic Grasping and Contact: A Review", IEEE International Conference on Robotics and Automation (ICRA), 2000, pp. 348-353.
Chen, X. et al., "A Robotic Manipulator Design with Novel Soft Actuators", 2017 IEEE International Conference on Robotics and Automation (ICRA), Singapore, May 29-Jun. 3, 2017, pp. 1878-1884.
Yi, J. et al., "A Three-Dimensional-Printed Soft Robotic Glove With Enhanced Ergonomics and Froce Capability", IEEE Robotics and Automation Letters, Jan. 2018, 3(1):242-248, IEEE.
Ciocarlie, M. et al., "The Velo gripper: A versatile single-actuator design for enveloping, parallel and fingertip grasps", The International Journal of Robotics Research, 2014, 33(5):753-767.
Dollar, A.M. et al., "Simple, Robust Autonomous Grasping in Unstructured Environments", 2007 IEEE International Conference on Robotics and Automation, Roma, Italy, Apr. 10-14, 2007, pp. 4693-4700, IEEE.

* cited by examiner

SOFT ROBOTIC GRIPPER WITH HYBRID STRUCTURE AND GRASPING RELIABILITY

CROSS-REFERENCE TO RELATED APPLICATIONS

This application is the U.S. national stage application of International Patent Application No. PCT/CN2018/120518, filed Dec. 12, 2018, which claims the benefit of U.S. Provisional Application No. 62/598,090, filed Dec. 13, 2017, the disclosure of each of which is incorporated herein by reference in its entirety.

BACKGROUND

A robotic end effector is a crucial connection for robots interacting with the environment and human beings. With the development of robotic systems, robots have been more widely applied in daily life and routines. From experimental and industrial fields to versatile and human centered environments, the primary design concerns of robotic end effectors have shifted from industrial concerns (accuracy, strength, speed, etc.) to human centered criteria, such as weight, safety, adaptability, task-worthiness, and affordability.

Following the shift of design requirements, avenues such as underactuation and variable stiffness mechanisms have been utilized for compliant grasping. In recent years, another approach for human centered end effector design, has involved the development of a soft robot. The soft robot provides inherent compliance and adaptability for safe human robot interaction as service robots, rehabilitation robots, personal robots, etc. Furthermore, with salient features of intrinsic softness and compliance, soft grippers exhibit adaptability to unstructured environments. This can reduce the complexity of a grasping system by eliminating high accuracy sensor feedback and sophisticated control systems, which increase system design affordability.

Soft grippers can safely deal with delicate materials, ranging from deep sea reefs to daily vegetables. A soft anthropomorphic hand can not only mimic the configuration of a human hand but also work dexterously providing promising potential for a newly soft artificial hand that can interact with human beings.

However, the inherent compliance of soft end effector also brings remarkable drawbacks, especially as lack of structural rigidity. To reduce this issue, some attempts have been proposed such as adding origami shell reinforcement and combination with rigid components. However, the tradeoff between structure rigidity and compliance creates a design problem.

Due to deformational characteristics of bending pneumatic actuators, which are commonly applied as fingers of an end effector, soft grippers often form a hollow grasping volume between fingers. This is appropriate for power and envelope grasping, but is not reliable for parallel grasping. Passive deformation of the finger is not easy to control, which can cause unstable grasping when a finger's passive force is larger than another finger's passive force. Furthermore, unstable grasping and finger contortion is easy induced when soft gripper interact with objects larger than the grasping volume. The above factors limit practical performance of soft gripper in real applications. Solutions need to be provided to resolve the drawbacks of soft grippers, which lack structure rigidity and are only good at small volume envelope grasping.

BRIEF SUMMARY

Embodiments of the subject invention provide a distinctive soft robotic gripper by combining a hybrid actuation mechanism by combining linear soft actuators with rigid joints, and independent joint control. A soft gripper, as shown in FIG. 1, can provide robust structure rigidity while maintaining inherent compliance at the same time. The actuation mechanism with a small material deformation resistance can realize a high output force to input pressure ratio. Programmable versatile grasping modes can be selected from envelope, parallel, and fully actuated grasping. The variable modes allow the soft gripper to interact with routine objects that each possess different physical characteristics. The present soft robotic gripper is fully customizable, and in one embodiment it may include different number of fingers and phalanges as desired, in another embodiment the bending angle between robotic finger and the base can be 180 degrees depending on the design parameter. In addition, the present soft robotic gripper is cost efficiency.

DETAILED DESCRIPTION

The current soft end-effectors directly use various bending soft pneumatic actuators (SPAs) as finger components. This working mechanism simplifies the structure and enlarges the compliance of soft grippers. However, the inherent compliance of SPAs also results in weak structure rigidity for the fingers, especially in lateral directions. Usually, bending SPAs also need to overcome the deformation resistance of the self-composed material, such as silicone. This can result in energy loss for the system. Additionally, the SPAs directly contact grasping target making the gripper vulnerable to sharp objects, which impacts the durability of the system.

As a result of the rigid joint structure, the systems and methods described herein can leverage more types of SPAs rather than bending SPAs. A pneumatic bellows can provide a light weight, but high output-force-to-input energy ratio. The transformation ratio of a bellows is large, and a bellows can contract or expand its self-length up to 300%. Therefore the joint is permitted to expand and contract actively. Furthermore, the stiffness of a pneumatic bellows can be adjusted at the same position by adjusting the input pressure. Compared to a silicone based soft actuator, the pneumatic bellows is less likely to bulge locally as a result of an even wall thickness.

The effective diameter of a pneumatic bellows can determine the maximum theoretical output force related to an intended joint force. Parameters determining elongation and compression range, such as the number of segments and initial segment angle, can be selected by considering the anticipated motion range of a joint. An example of the parameters of a customized bellows and compliant joint are seen in Table I.

Figure 1:
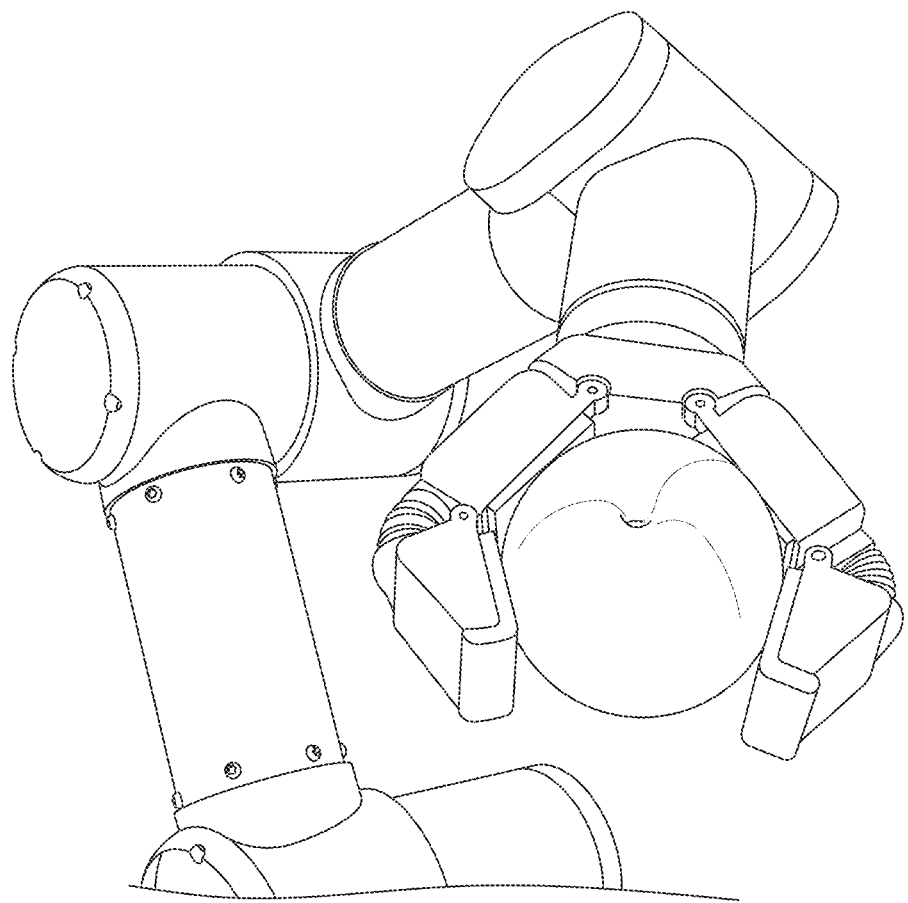
FIG. 1 is an image showing a soft robotic gripper.
Figure 2A:
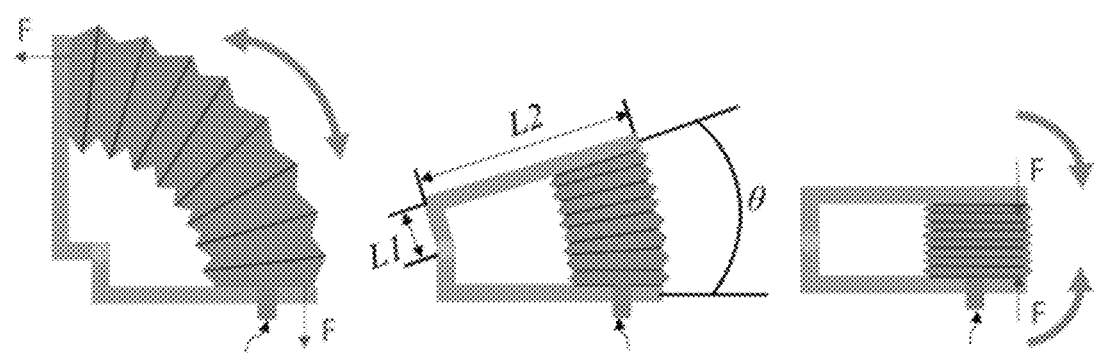
FIG. 2A is a diagram showing a working mechanism of a compliant joint.
Figure 2B:
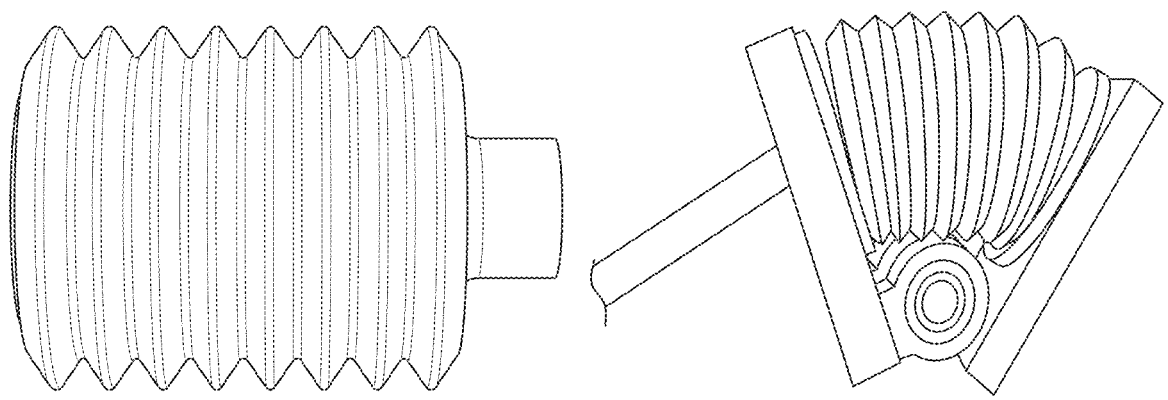
FIG. 2B is two images showing a customized pneumatic bellows and a compliant joint.

A diagram of a pneumatic bellows is shown in FIG. 2(a), and photographic images of a bellows are provided in FIG. 2(b). When positive pressure through an air vent 100 is introduced into the bellows 110, the pneumatic bellows elongates and pushes the joint to expand. In contrast, by introducing negative pressure or a vacuum in the bellows, the bellows will drive the joint to close. By adjusting the applied pressure, the joint can realize a dexterous compliant bending capacity.

TABLE I

| Pneumatic bellows design parameters | |
|---|---|
| Chamber diameter (mm) | 21 |
| Effective diameter (mm) | 20 |
| Maximum chamber length (mm) | 40 |
| Minimum chamber length (mm) | 8 |
| Number of segments | 8 |
| Initial segment angle (degree) | 80 |
| Thickness of inner chamber (mm) | 0.2 |
| Maximum extension ratio (%) | 200 |
| L1 (mm) | 5 |
| L2 (mm) | 20 |
| Minimum angle (degree) | 0 |
| Maximum angle (degree) | 90 |

Figure 3:
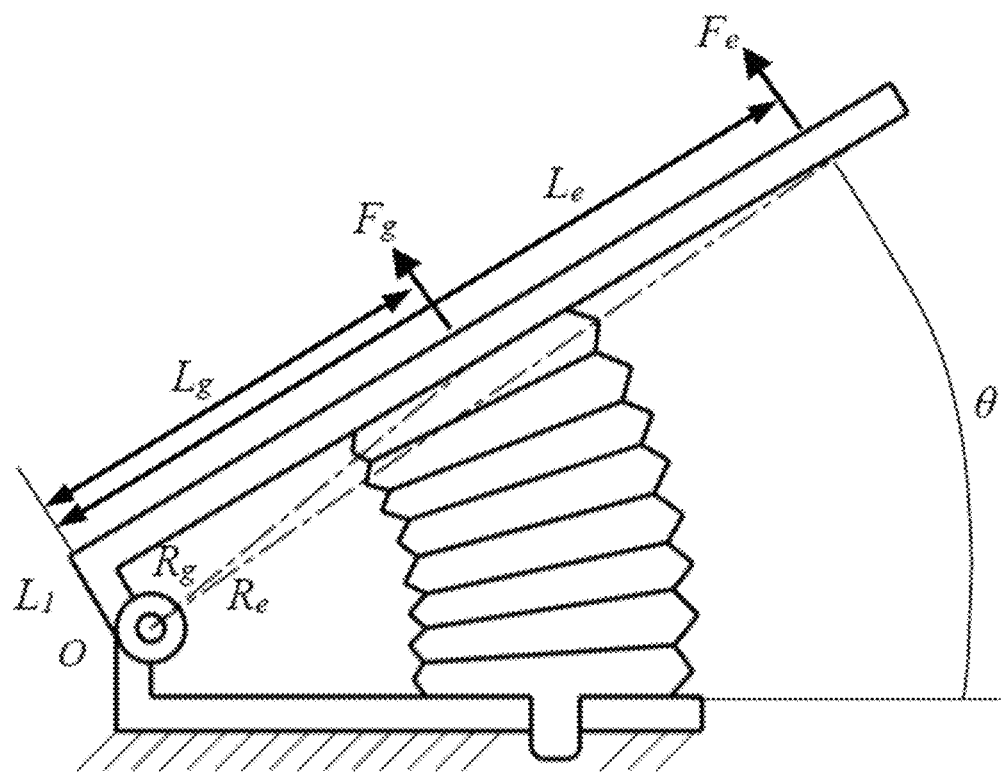
FIG. 3 is a diagram of a model of a compliant joint.

As shown in FIG. 3, the effective output force Fg is the perpendicular output force on the side of the joint, which is equal to the positive contact pressure when grasping.

For a linear pneumatic bellows, the relationship between input pressure and output force can be derived as follows:

$$F = P\frac{\pi D_i^2}{4} + f(l) \quad (1)$$

Where P is input pressure, $D_i$ is the diameter of the bellows opening, and F is the output force. As the joint confines the deformation of pneumatic bellows, energy is dissipated from the system. Then, the effective force $F_e$ generated by bellows transfer to joint wall can be expressed as:

$$F_g = P\frac{\pi D_i^2}{4} + f(\theta) \quad (2)$$

Where θ is the joint bending angle. The effective force $F_e$ at an arbitrary length $L_e$ can be described by the generated force as follows:

$$F_e = F_g + \frac{R_g}{R_e} \quad (3)$$

Where $R_g$ and $R_e$ are the moment arm of the force for bellows and the effective output respectively, which could be described by the arbitrary length $L_e$ and the bellows mounting length $L_g$:

$$R_g = \sqrt{L_1^2 + L_g^2}, R_e = \sqrt{L_1^2 + L_e^2} \quad (4)$$

Then, the effective force $F_e$ at an arbitrary length $L_e$ can be expressed as:

$$F_e = \frac{\sqrt{L_1^2 + L_g^2}}{\sqrt{L_1^2 + L_e^2}} \left( P\frac{\pi D_i^2}{4} + f(\theta) \right) \quad (5)$$

This relationship provides a reference for the finger structure design according to embodiments of the subject invention. The analytical model has been validated by comparison with experimental measurements described herein.

The tradeoff between grasping dexterity and system complexity is a design problem for a robotic end effector. Conventionally, in order to achieve dexterous grasping ability, an end effector needed a complex mechanical structure combining high accuracy sensor feedback and sophisticate algorithms. This potentially hinders the production of complex and versatile end effectors due to financial constraints.

Figure 4:
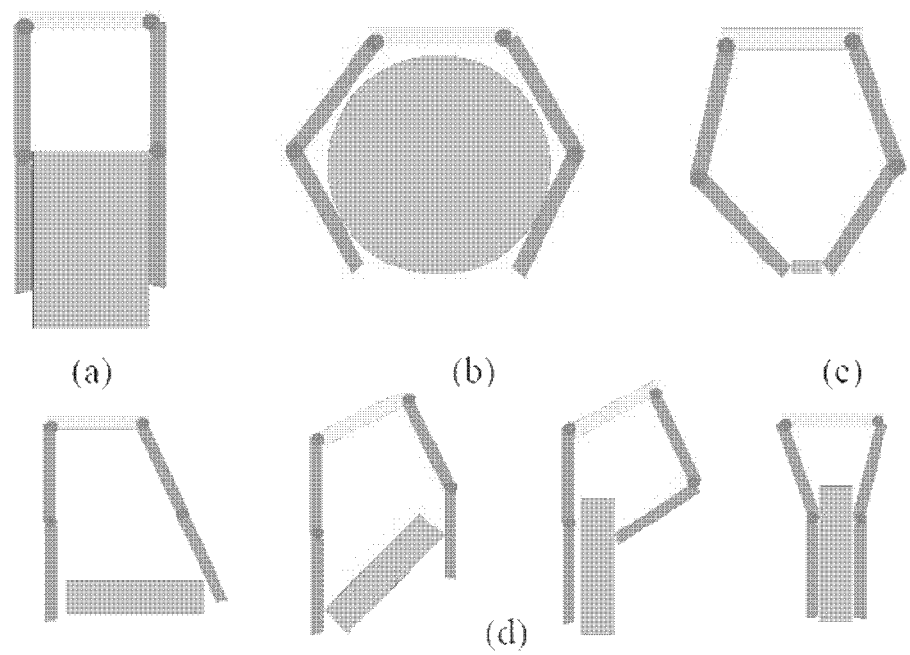
FIG. 4 shows diagrams of grasping modes including: (a) parallel grasping, (b) enveloping grasp, (c) finger-tip pinch, and (d) fully actuated grasp and manipulation.

Embodiments of the subject invention provide a soft end effector with a minimalist mechanical structure and a versatile grasping ability towards a wide variety of objects. The soft gripper can function using at least four grasping modes and are described as follows: (1) parallel grasping, (2) enveloping grasping, (3) finger-tip pinch, and (4) fully actuated grasping. Parallel grasping, as shown in FIG. 4(a), can be used for objects with a flat surface, such as a CD, a book, a rectangular box, etc. Envelope grasp, as shown in FIG. 4(b), is dedicated for spherical objects, like cylindrical bottle, ball, etc. For small objects, finger-tip pinch, as shown in FIG. 4(c), can be used. Additionally, fully actuated grasping provides practical functions for real world applications. As shown in FIG. 4(d), each joint of end effector can be actuated individually in a desired order. The soft gripper can realize simple in-hand or contact manipulation, such as adjusting the orientation of grasping target.

Example 1

Figure 5:
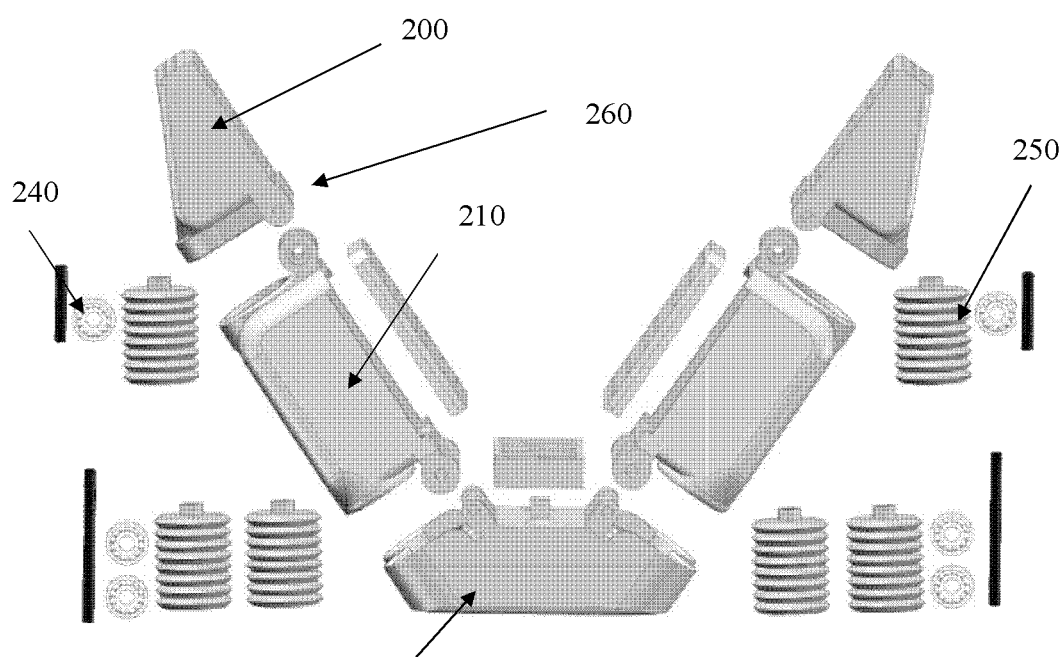
FIG. 5 is a diagram of a 3D assembly model of a soft gripper. Each joint component is presented next to its joint, respectively.

To fabricate a two-finger soft gripper, the design parameters as shown in Table II were chosen. The CAD assembly of the soft gripper comprising two fingers 260 is presented in FIG. 5. A smaller ratio of bellows 250 at the proximal joint to the distal joint, leads to better compliance of the gripper. Therefore, two pneumatic bellows 250 were set at the proximal joint between the base 230 and the proximal phalange 210. One bellows 250 was set at the distal joint between the proximal phalange 210 and the distal phalange 200, as seen in FIG. 5. Pins and bearings 240 were used for assembly. This configuration helps to provide different joint stiffness when applying the same pressure, which provides better compliance with the grasping target. To enhance contact friction, contact areas 220 of the gripper were casted with a layer of silicone wave surface skin using Dragon skin 10. The prototype gripper was mainly fabricated by material deposition method, with a commercially available 3D printer, and the connection of different components using HY-304 AB glue.

TABLE II

Pneumatic Bellows Design Parameters

| | Base | Proximal Phalange | Distal Phalange |
|---|---|---|---|
| Length (mm) | 36 | 62 | 52 |
| Width (mm) | 10 | 35-50 | 35 |

Figure 6:
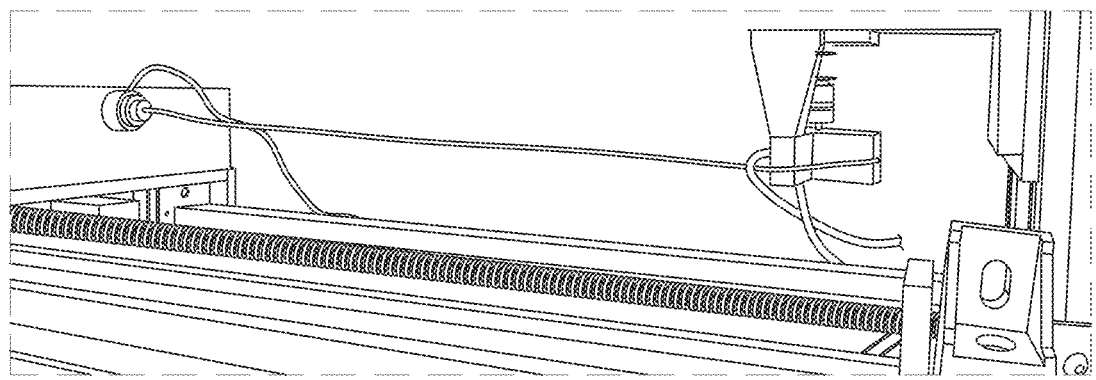
FIG. 6 is an image of a joint test platform. The test joint is driven by an inextensible cable which is connected to a force sensor mounted on a linear stage.

The validation examples 2-5 were processed on a dedicated test platform as shown in FIG. 6. A prototype joint was fabricated for experiments and mounted on one side of the test platform. The air pressure for the joint was regulated by a pressure valve (SMC ITV2030). The flow rate and direction were adjusted by a proportional valve (Festo MPYE-5-1/8-HF-010-B). A rotation encoder was connected with the joint shaft by a clutch, and a force sensor was mounted on the linear stage. One unstretchable cable connected the force sensor and the rotation side of the joint. Although the connecting cable was not vertical to the joint bending side in bending process, a geometric relationship was taken into account to amend it. The force in the test results was a sum of force components perpendicular to the rotational joint side. The test platform was controlled by a microcontroller STM32f429IGT with a clock frequency up to 180 MHz. All tests were processed five times and averaged.

Example 2

Figure 7A:
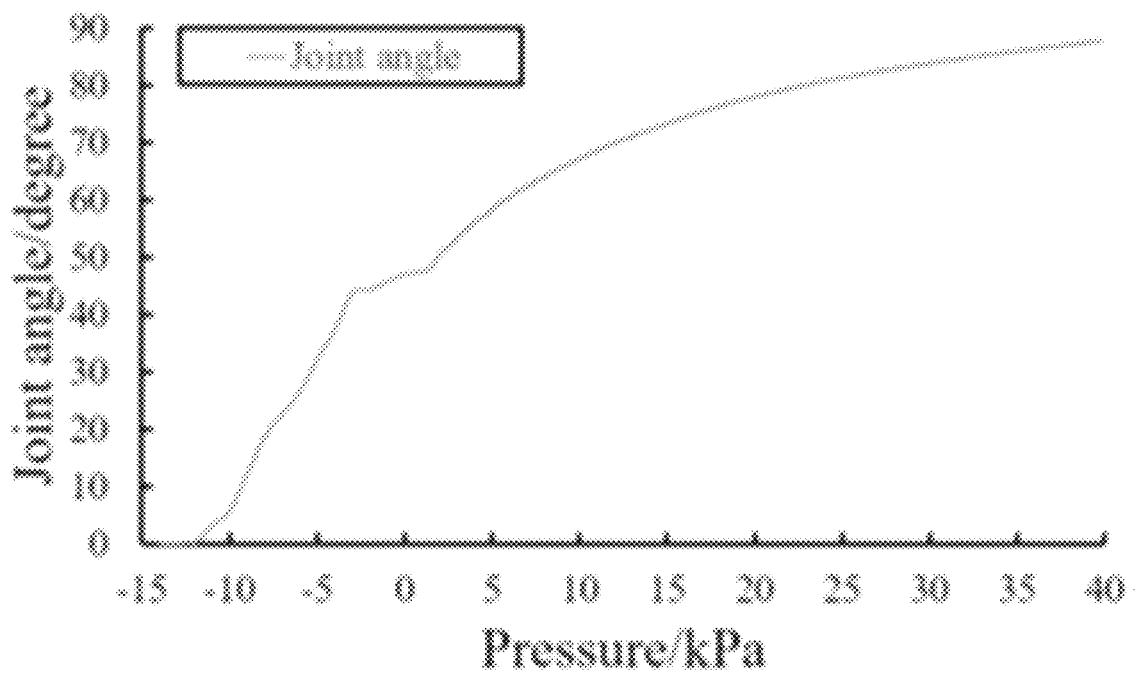
FIG. 7A is a plot of the relationship of input pressure and bending angle.

The relationship between the joint bending angle and supplied pressure under no payload was measured. The results, as shown in FIG. 7A, demonstrate that the soft gripper can arrive at a large working range with a low supplied pressure within 40 kPa.

Example 3

Figure 7B:
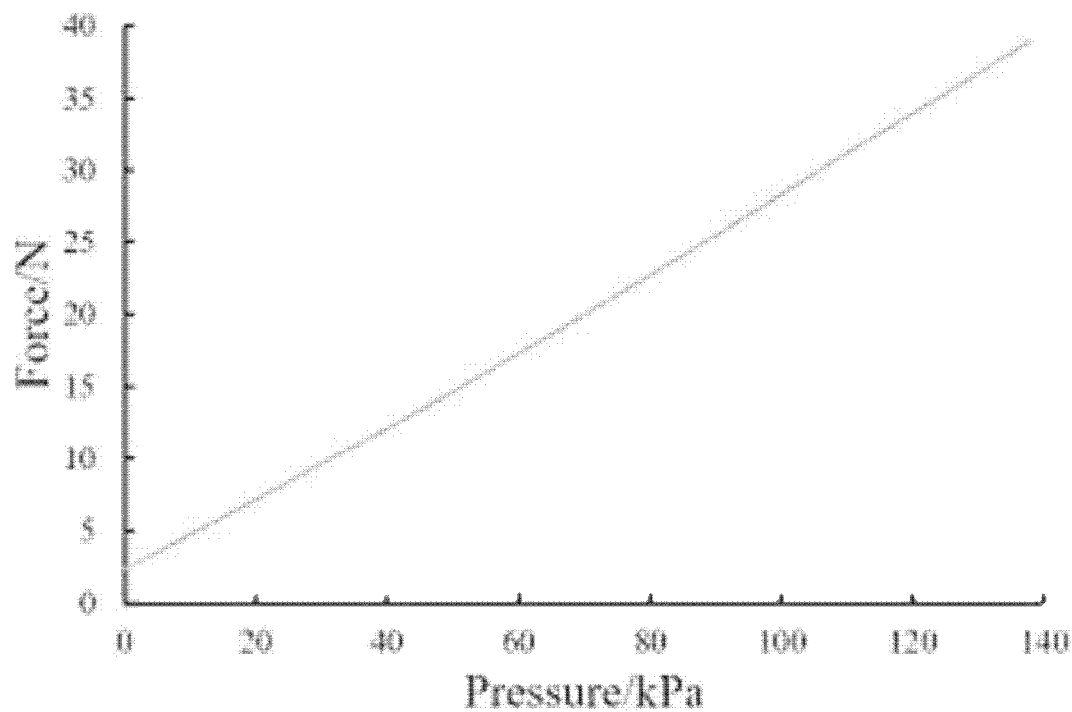
FIG. 7B is a plot of the maximum output force test.

The high energy transfer ratio of the mechanism was measured. The results, as shown in FIG. 7B demonstrates that the soft gripper can achieve 30N output force within an applied 1 Bar of input pressure, which is close to the theoretical maximum output force with minimum energy loss.

Example 4

Figure 8:
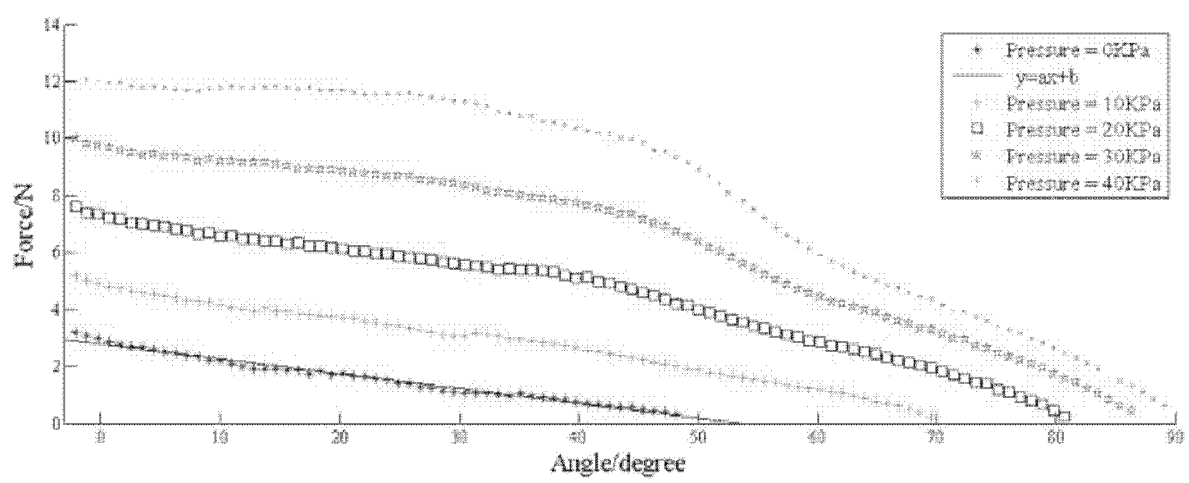
FIG. 8 is a plot of the relationship between joint force behavior and the supplied pressure under different bending angles.

The relationship between joint force with variable pressure and different bending angles was measured. The test results are shown in FIG. 8, and can be divided into two stages. Between 0-60 degrees, which is the main working range of the joint, the joint force exhibited a linear response to the bending angle under different pressures. Between 60-90 degrees, the ratio of force decrement to angle decrement was greater than the ratio between 0-60 degrees. This may be caused by the mechanical structure of the joint. Two ends of a pneumatic bellows were restricted by the rigid joint. At the working process, the elongation force not only pushed the joint to expand but also bulged up the middle section of bellows. Under large bending angle, the length of pneumatic bellows was longer than those under small bending angle, therefore the bulge was more easily induced. As a result, the joint force decrement to angle decrement ratio was greater when the bending angle was higher than 60 degrees. The test results were highly repeatable, which illustrates that the pneumatic bellows joint can be modeled and controlled.

The relationship between the joint force at 0 kPa barometric pressure and the bending angle was determined by the inherent material deformation resistance of the pneumatic bellows. The inherent resistance angle relationship curve was derived from the test results under 0 kPa.

The fitted line with first order can be expressed as:

$$f(\theta) = -0.052411x + 2.7968 \tag{6}$$

Then the effective force can be described as:

$$F_e = \frac{\sqrt{L_1^2 + L_g^2}}{\sqrt{L_1^2 + L_e^2}} \left( P \frac{\pi D_i^2}{4} - 0.05241x + 8.1268 \right) \tag{7}$$

Example 5

Figure 9:
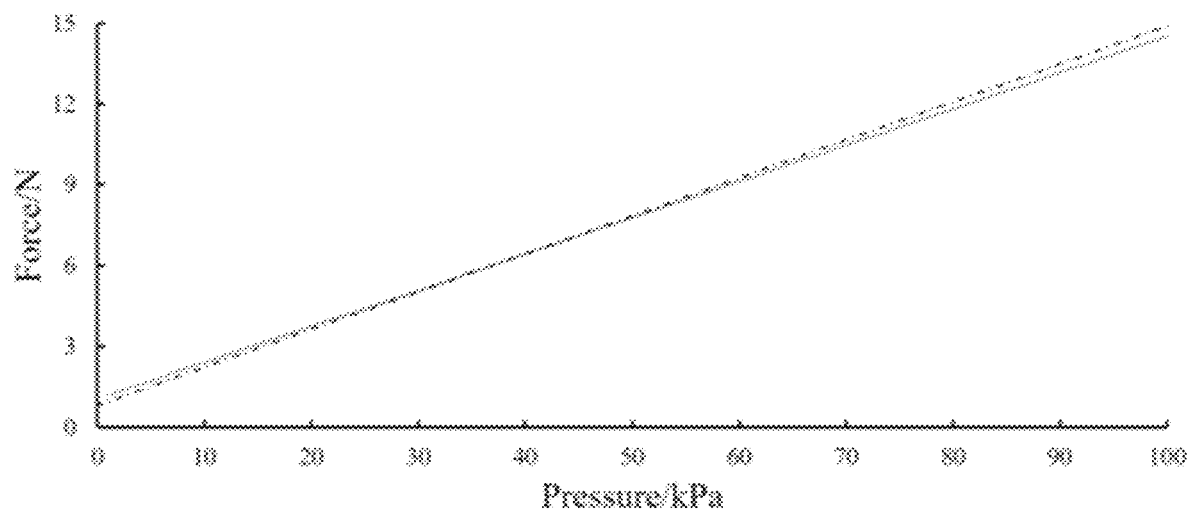
FIG. 9 is a plot of the finger output force test.

The real finger-tip effective force under a 0 degree bending angle was measured. The results, as shown in FIG. 9, were consistent with the analytical results.

Figure 10:
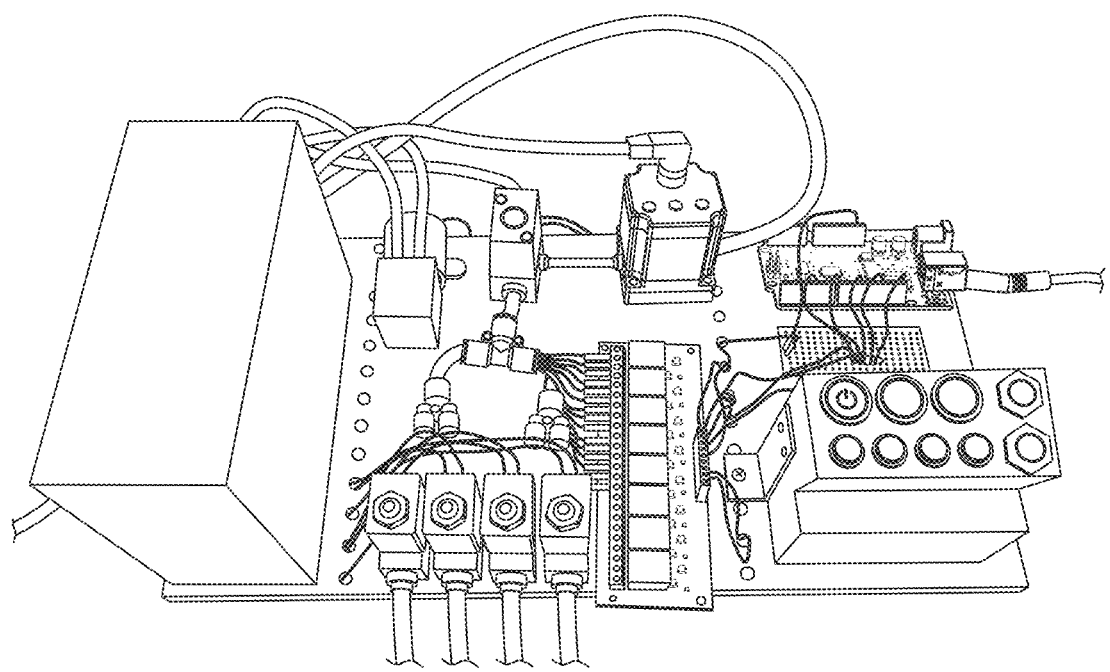
FIG. 10 is an image of specialized control board for controlling the soft gripper. The individual components are as follows: (1) a steady pressure tank, (2) a pump, (3) a ⅔ valve, (4) a regulator, (5) a microcontroller, (6) a bread board, (7) a switch, (8) MOSFETs, (9) a solenoid valves, and (10) supplied pressure to each joint.

FIG. 10 is an image of specialized control board for controlling the soft gripper. The individual components are as follows: (1) a steady pressure tank, (2) a pump, (3) a ⅔ valve, (4) a regulator, (5) a microcontroller, (6) a bread board, (7) a switch, (8) MOSFETs, (9) a solenoid valves, and (10) supplied pressure to each joint.

Figure 11:
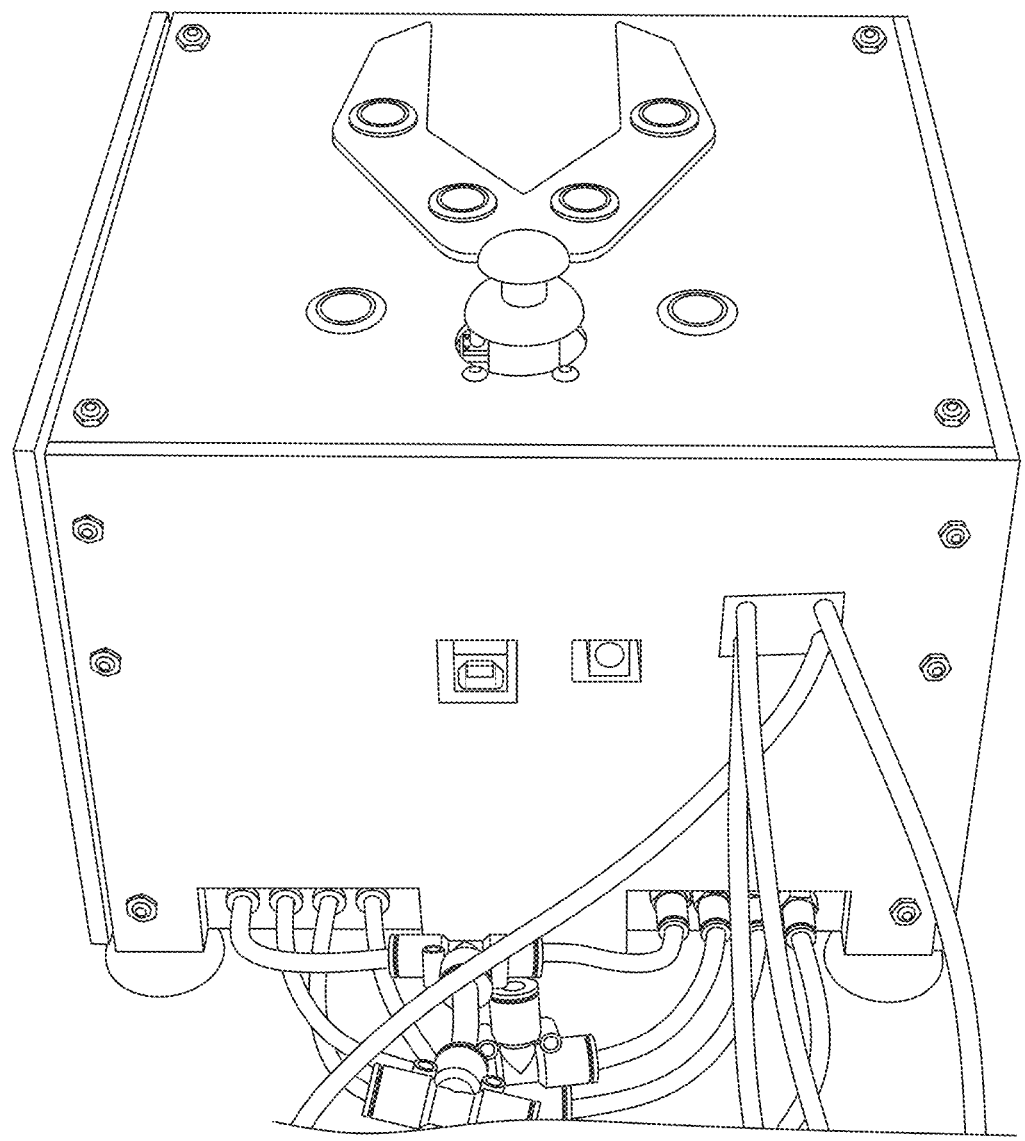
FIG. 11 is an image of a portable control box in accordance to one embodiment of the present invention.

The specialized control board for controlling the soft gripper can be further minimized and fitted in a box to form a portable control box for controlling at least one soft gripper. FIG. 11 is an image of the portable control box in accordance to one embodiment of the present invention. The portable control box is configured to connect to at least one soft gripper. In one embodiment the dimension of the portable control box is 300 mm×300 mm×300 mm.

Figure 12:
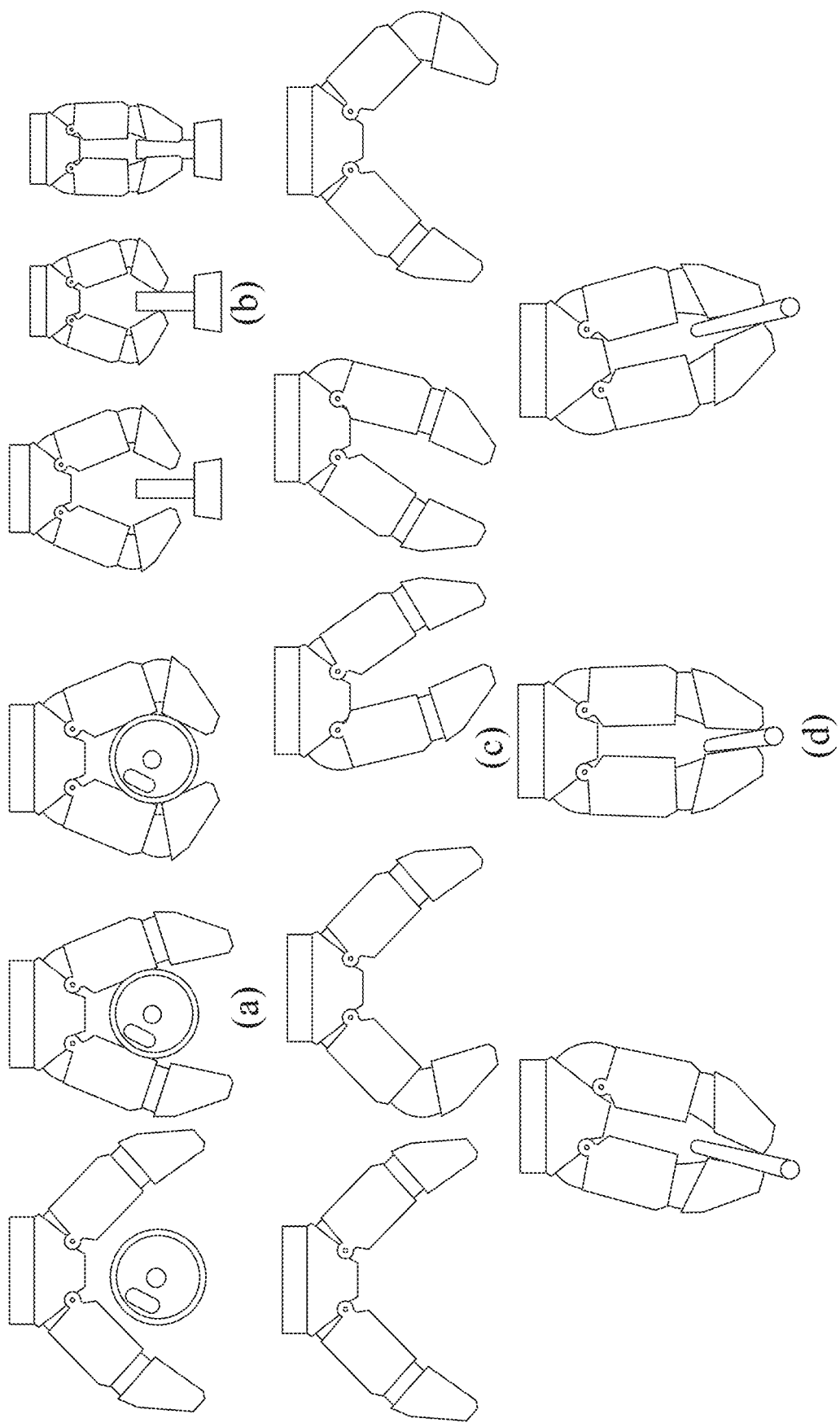
FIG. 12 is an image of different processes of a soft gripper. The processes are as follows: (a) envelope grasping process, (b) parallel grasping process, (c) fully actuated presentation, and (d) simple in-hand manipulation.

FIG. 12 is an image of different processes of a soft gripper. The processes are as follows: (a) envelope grasping process, (b) parallel grasping process, (c) fully actuated presentation, and (d) simple in-hand manipulation.

Figure 13:
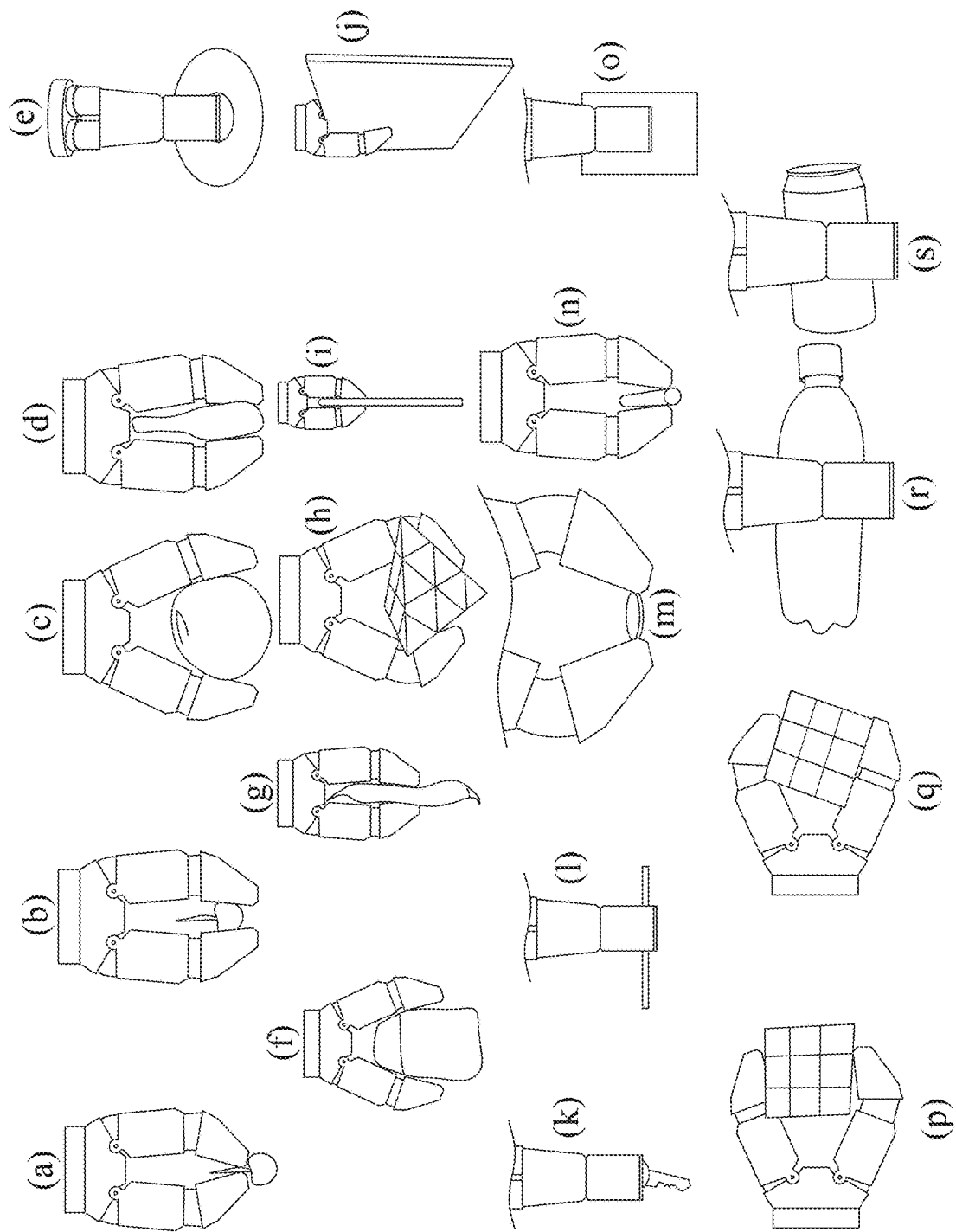
FIG. 13 is an image of a soft gripper and different objects. The objects are as follows: (a) a cherry tip, (b) a cherry, (c) an apple, (d) a banana, (e) a CD, (f) a sandwich, (g) a food bag, (h) a pyramid, (i) a medium sized book, (j) a large book, (k) a key, (l) a hexagon wrench, (m) a coin, (n) a pen, (o) a business card, (p) a cube 1, (q) a cube 2, (r) a drink bottle, and (s) a drink can.

FIG. 13 is an image of a soft gripper and different objects. The objects are as follows: (a) a cherry tip, (b) a cherry, (c) an apple, (d) a banana, (e) a CD, (f) a sandwich, (g) a food bag, (h) a pyramid, (i) a medium sized book, (j) a large book, (k) s a key, (l) a hexagon wrench, (m) a coin, (n) a pen, (o) a business card, (p) a cube 1, (q) a cube 2, a (r) a drink bottle, and (s) a drink can.

Figure 14:
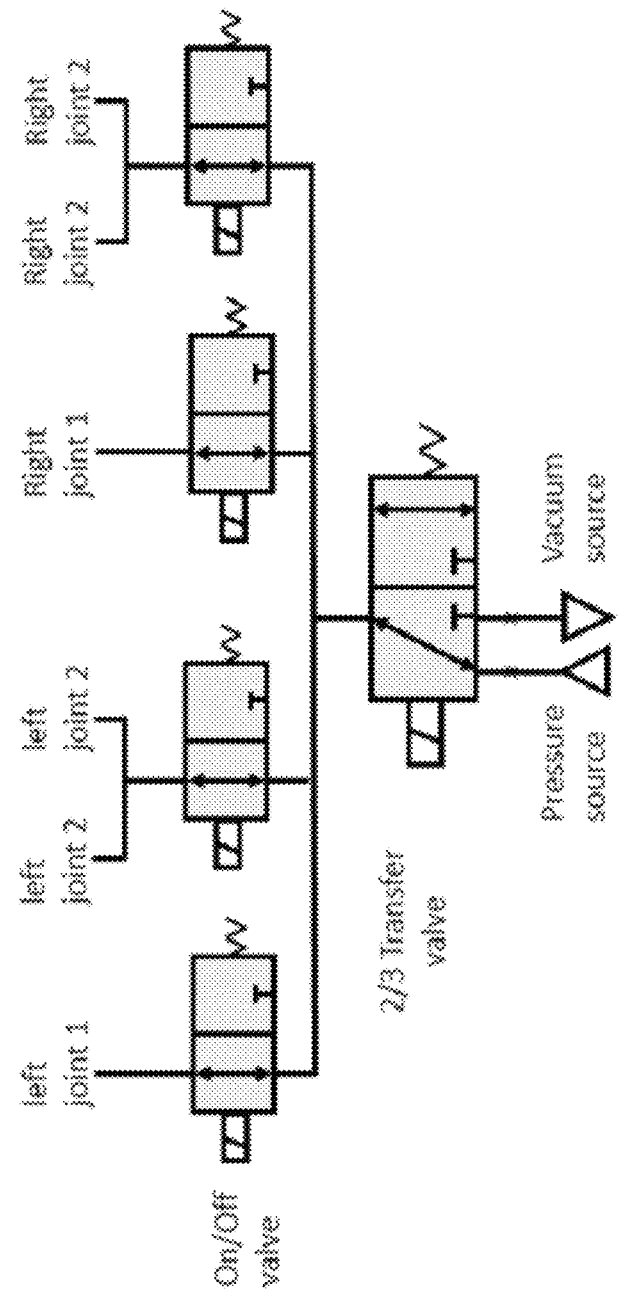
FIG. 14 is a schematic diagram of an actuation system.

A schematic diagram of an actuation system is presented in FIG. 14. A pump can provide both positive and negative pressure to a bellows, four solenoid valves can direct gas flow to each joints, and a ⅔ reversing valve can switch between positive and negative pressure source.

The soft gripper can operate under at least four actuation modes including one expanding mode. A finger-tip pinch can be realized by parallel grasping combined with the silicone wrapped skin. The four modes are described as follows:

1. Expanding mode: The four joints are supplied negative pressure to open the gripper. The four solenoid valves are opened together when giving the expansion command.

2. Power grasping mode: The four joints are actuated simultaneously with positive pressure. The four solenoid valves are opened together.

3. Parallel grasping mode: Only the proximal joints are actuated and the distal joints are maintained in their initial state. The solenoid valves for the distal joints are kept closed and the valves for the proximal joints are kept open. The distal phalanges sweep to close and form a parallel grasping volume between two fingers.

4. Fully actuated mode: The four joints can work at different pressures by controlling the four valves independently.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processor performs the methods and processes embodied as data structures and code stored within the computer-readable storage medium. It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

Figure 15:
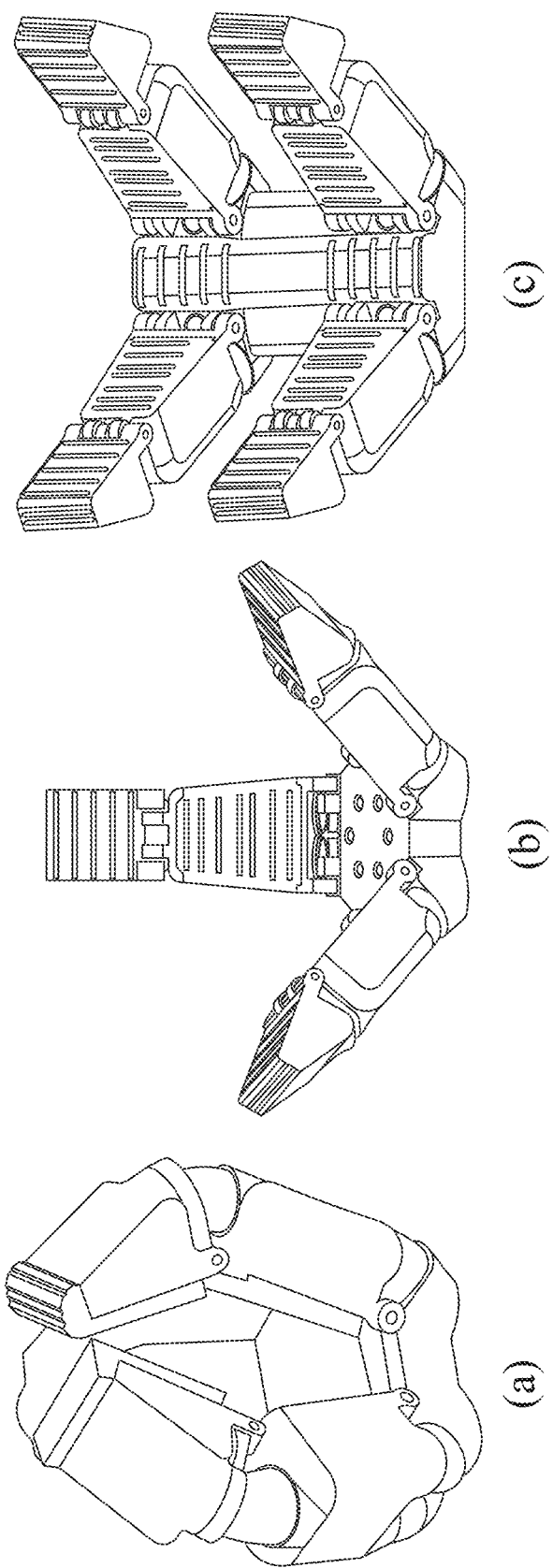
FIG. 15 is a diagram showing: (a) 2-fingered gripper prototype; (b) 3-fingered gripper rendering design; and (c) 4-fingered gripper rendering design.

Other embodiments of the present invention show the soft robotic gripper comprising more than two fingers. As shown in FIG. 15(a), the soft robotic gripper comprises three fingers. Besides, as the proposed robotic gripper is a highly integrated modular, various number of fingers can simply be installed on the dedicated robotic base. FIGS. 15(b) and 15(c) show the soft robotic gripper with three and four fingers.

Figure 16:
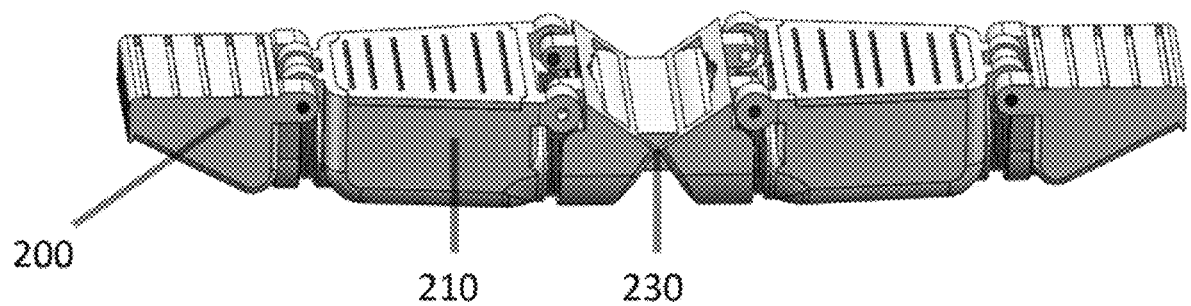
FIG. 16 is a diagram of 2-fingered gripper rendering design, wherein the angle between 210 and 230 can be designed up to 180 degrees.

In another embodiment, as shown in FIG. 16, the bending angle between robotic finger and base 230, that is the angle between 210 and 230, is customizable. The width of part 230 is also customizable depending on particular condition or working requirements. In one embodiment, the bending angle can be 180 degrees as depicted in FIG. 16. Thus the grasping volume of the gripper is highly adjustable depending on the design parameter.

Figure 17:
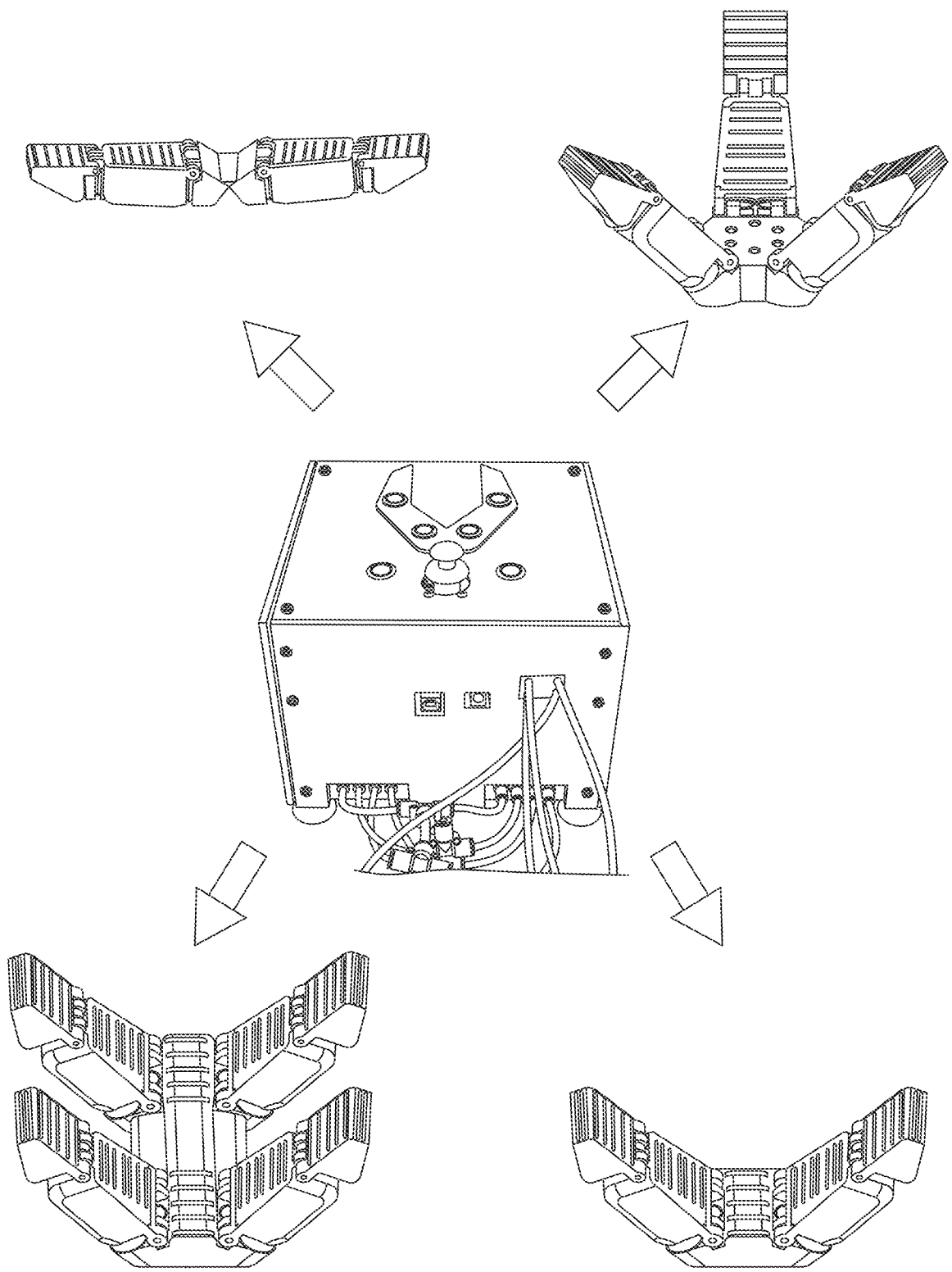
FIG. 17 is an image of a robotic grasping system including the portable control box, and the soft robotic grippers.

As shown in FIG. 17, another embodiment of the present invention shows a robotic grasping system comprising the portable control box, which is configured to connect to at least one soft robotic gripper. The soft robotic gripper connected could be selected from one of the embodiments discussed herein.

The subject invention includes, but is not limited to, the following exemplified embodiments.

Embodiment 1

A robotic end effector, the effector comprising:
a rigid base structure;
a plurality of rigid proximal phalanges connected to the rigid base structure;
a plurality of rigid distal phalanges connected to the proximal phalanges respectively; and
a plurality of bellows;
wherein one end of a proximal phalange is connected to one end of the base structure by a bellows, and
wherein one end of a distal phalange is connected to a proximal phalange by a bellows.

Embodiment 2

The robotic end effector of embodiment 1, wherein a portion of the base structure, each proximal phalange, and each distal phalange are covered in a silicone rubber.

Embodiment 3

The robotic end effector according to any of embodiments 1-2, wherein each bellows includes a gas vent.

Embodiment 4

The robotic end effector according to any of embodiments 1-3, further comprising:
a pneumatic control system providing actuation air to the effector,
wherein the control system is configured to supply positive or negative pressure to each bellows, and
wherein the control system is comprised of:
a pressure source connected to a solenoid directional control valve;

a vacuum source connected to the solenoid directional control valve; and a plurality of solenoid valves connected to the solenoid directional control valve, wherein each solenoid valve is connected to each bellows, respectively.

Embodiment 5

The robotic end effector according to any of embodiments 1-4, wherein a ratio of bellows connecting the base structure to a proximal phalange and bellows connecting a proximal phalange to a distal phalange is at least 2:1 or greater.

Embodiment 6

The robotic end effector according to any of embodiments 1-5, wherein the effector comprises:

two proximal phalanges connected to the rigid base structure; and two distal phalanges connected to each proximal phalange, respectively;

wherein a proximal joint between the rigid base structure and the proximal phalange comprises two bellows, and wherein a distal joint between the distal phalange and the proximal phalange comprises one bellows.

Embodiment 7

A method of actuating a robotic end effector, the method comprising:

providing a robotic end effector according to any of embodiments 1-6; and providing or removing gas pressure to each bellows to cause each bellows to expand or contract.

Embodiment 8

The method of embodiment 7, wherein negative pressure is supplied to the bellows disposed at the two distal joints and the bellows disposed at the two proximal joints.

Embodiment 9

The method of embodiment 7, wherein positive pressure is supplied to the bellows disposed at the two distal joints and the bellows disposed at the two proximal joints.

Embodiment 10

The method according to any of embodiments 7-9, wherein only the proximal joints are actuated and the distal joints are maintained in their initial state.

Embodiment 11

The method according to any of embodiments 7-9, wherein all four joints are actuated at different pressures.

Embodiment 12

The method according to any of embodiments 7-9, wherein all four joints are actuated at the same pressure.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] Shen, H. (2016). Meet the soft, cuddly robots of the future. Nature, 530(7588), 24-26.

[2] Rus, D., & Tolley, M. T. (2015). Design, fabrication and control of soft robots. Nature, 521(7553), 467-75.

[3] Wang Z, Hirai S. A Prestressed Soft Gripper: Design, Modeling, Fabrication, and Tests for Food Handling[J]. IEEE Robotics & Automation Letters, 2017, PP(99):1-1.

[4] Zhou J, Chen S, Wang Z. A Soft Robotic Gripper with Enhanced Object Adaptation and Grasping Reliability [J]. IEEE Robotics & Automation Letters, 2017, PP (99):1-1. Soft Robotics Inc.

[5] Softroboticsinc. 2017. softroboticsinc soft gripper. [ONLINE] Available at: https://www.softroboticsinc.com./. [Accessed 15 Nov. 2017].

[6] Galloway, K. C., Becker, K. P., Phillips, B., Kirby, J., Licht, S., & Dan, T., et al. (2016). Soft robotic grippers for biological sampling on deep reefs. Soft Robotics, 3(1), 23-33.

[7] Ilievski, F., Mazzeo, A. D., Shepherd, R. F., Chen, X., & Whitesides, G. M. (2011). Soft robotics for chemists. Angewandte Chemie International Edition, 50(8), 1890-1895.

[8] Deimel, R., & Brock, O. (2013). A compliant hand based on a novel pneumatic actuator. IEEE International Conference on Robotics and Automation (pp. 2047-2053).

[9] Deimel, R., & Brock, O. (2015). A novel type of compliant and underactuated robotic hand for dexterous grasping. International Journal of Robotics Research, 35(1), 161-185.

[10] Marchese, A. D., Katzschmann, R. K., & Rus, D. (2015). A recipe for soft fluidic elastomer robots. Soft Robot, 2(1), 7-25.

[11] Gaiser, I., Schulz, S., Kargov, A., & Klosek, H. (2008). A new anthropomorphic robotic hand. Humanoids 2008, Ieee-Ras International Conference on Humanoid Robots (pp. 418-422). IEEE.

[12] Borenstein, J., & Borrell, A. (2008). The OmniTread OT-4 serpentine robot. IEEE. International Conference on Robotics and Automation (Vol. 24, pp. 1766-1767).

[13] Schulz, S., Pylatiuk, C., & Bretthauer, G. (2003). A new ultralight anthropomorphic hand. IEEE International Conference on Robotics and Automation, 2001. Proceedings (Vol. 3, pp. 2437-2441 vol. 3). IEEE.

[14] Paez L, Agarwal G, Paik J. Design and Analysis of a Soft Pneumatic Actuator with Origami Shell Reinforcement[J]. Soft Robotics 2016, 3(3).

[15] Chen, Y., Le, S., Tan, Q. C., Lau, O., Wan, F., & Song, C. (2017). A Reconfigurable Hybrid Actuator with Rigid and Soft Components. IEEE International Conference on Robotics and Automation. IEEE.
[16] Bicchi, A., & Kumar, V. (2002). Robotic grasping and contact: a review. IEEE International Conference on Robotics and Automation, 2000. Proceedings. ICRA (Vol. 1, pp. 348-353). IEEE.
[17] Chen, X., Peng, J., Zhou, J., Wang, Z., Wang, M. Y., & Chen, Y. H. (2017). A robotic manipulator design with novel soft actuators. In IEEE International Conference on Robotics and Automation, ICRA 2017.
[18] Yi J, Chen X, Wang Z. A 3D-Printed Soft Robotic Glove with Enhanced Ergonomics and Force Capability[J]. IEEE Robotics & Automation Letters, 2018, PP(99):1-1.
[19] Ciocarlie, M., Hicks, F. M., Holmberg, R., Hawke, J., Schlicht, M., & Gee, J., et al. (2014). The velo gripper: a versatile single-actuator design for enveloping, parallel and fingertip grasps. International Journal of Robotics Research, 33(5), 753-767.
[20] Dollar, A. M., & Howe, R. D. (2007). Simple, Robust Autonomous Grasping in Unstructured Environments. IEEE International Conference on Robotics and Automation (pp. 4693-4700), IEEE.

What is claimed is:

1. A robotic end effector, the effector comprising:
   a rigid base structure;
   a plurality of rigid proximal phalanges connected to the rigid base structure;
   a plurality of rigid distal phalanges connected to the proximal phalanges respectively; and
   a plurality of bellows;
   wherein one end of each proximal phalange is connected to one end of the base structure by a bellows to form a proximal joint,
   wherein one end of each distal phalange is connected to a respective proximal phalange by a bellows to form a distal joint, and
   wherein each bellows includes a gas vent.

2. The robotic end effector of claim 1, wherein a portion of the base structure, each proximal phalange, and each distal phalange are covered in a silicone rubber.

3. The robotic end effector according to claim 1, further comprising:
   a pneumatic control system providing actuation air to the effector,
   wherein the control system is configured to supply positive or negative pressure to each bellows, and
   wherein the control system is comprised of:
   a pressure source connected to a solenoid directional control valve;
   a vacuum source connected to the solenoid directional control valve; and
   a plurality of solenoid valves connected to the solenoid directional control valve,
   wherein each solenoid valve is connected to each bellows, respectively.

4. The robotic end effector according to claim 1, wherein a ratio of bellows connecting the base structure to a proximal phalange and bellows connecting a proximal phalange to a distal phalange is at least 2:1 or greater.

5. The robotic end effector according to claim 1, wherein the effector comprises:
   two proximal phalanges connected to the rigid base structure; and
   two distal phalanges, one connected to each proximal phalange, respectively;
   wherein a proximal joint between the rigid base structure and each proximal phalange comprises two bellows, and
   wherein a distal joint between each distal phalange and the respective proximal phalange comprises one bellows.

6. A method of actuating a robotic end effector, the method comprising:
   providing a robotic end effector according to claim 1; and
   providing or removing gas pressure to each bellows to cause each bellows to expand or contract.

7. The method of claim 6, wherein negative pressure is supplied to the bellows disposed at the two distal joints and the bellows disposed at the proximal joints.

8. The method of claim 6, wherein positive pressure is supplied to the bellows disposed at the two distal joints and the bellows disposed at the proximal joints.

9. The method according to claim 6, wherein only the proximal joints are actuated and the distal joints are maintained in their initial state.

10. The method according to claim 6, wherein all joints are actuated at different pressures.

11. The method according to claim 6, wherein all joints are actuated at the same pressure.

* * * * *